(12) United States Patent
Alkhazraji (10) Patent No.: US 10,590,011 B2
(45) Date of Patent: *Mar. 17, 2020

(54) SOLAR STILL SYSTEM AND RELATED WATER TRANSPORTATION APPARATUS

(71) Applicant: Saeed Alhassan Alkhazraji, Abu Dhabi (AE)

(72) Inventor: Saeed Alhassan Alkhazraji, Abu Dhabi (AE)

(*) Notice: Subject to any disclaimer, the term of this patent is extended or adjusted under 35 U.S.C. 154(b) by 555 days.

This patent is subject to a terminal disclaimer.

(21) Appl. No.: 14/725,985

(22) Filed: May 29, 2015

(65) Prior Publication Data

US 2016/0060136 A1 Mar. 3, 2016

Related U.S. Application Data

(63) Continuation-in-part of application No. 14/469,255, filed on Aug. 26, 2014.

(51) Int. Cl.
| | | |
|---|---|---|
| *C02F 1/14* | (2006.01) | |
| *B01D 1/00* | (2006.01) | |
| *B01D 5/00* | (2006.01) | |
| *C02F 103/08* | (2006.01) | |
| *C02F 103/00* | (2006.01) | |

(52) U.S. Cl.
CPC ............. *C02F 1/14* (2013.01); *B01D 1/0005* (2013.01); *B01D 1/0029* (2013.01); *B01D 1/0088* (2013.01); *B01D 5/0057* (2013.01); *B01D 5/0066* (2013.01); *B01D 1/0035* (2013.01); *B01D 5/006* (2013.01); *C02F 2103/007* (2013.01); *C02F 2103/08* (2013.01); *Y02A 20/128* (2018.01); *Y02A 20/212* (2018.01)

(58) Field of Classification Search
CPC ............ B01D 1/00–305; B01D 5/0048; B01D 5/006; B01D 5/0057; B01D 5/0078; B01D 5/0081; B01D 5/009; B01D 5/0018; B01D 5/0066; C02F 1/04–18; B01L 31/00; B01B 1/00
USPC .................................................. 159/903, 904
See application file for complete search history.

(56) References Cited

U.S. PATENT DOCUMENTS

| | | | | |
|---|---|---|---|---|
| 2,636,129 A | * | 4/1953 | Agnew | ................... C02F 1/046 |
| | | | | 126/639 |
| 2,807,912 A | | 10/1957 | Bjorksten | |
| 2,813,063 A | | 11/1957 | Bjorksten | |

(Continued)

*Primary Examiner* — Jonathan Luke Pilcher
(74) *Attorney, Agent, or Firm* — Hayes Soloway P.C.

(57) ABSTRACT

There is provided a water transportation system comprising evaporation zones for converting water into water vapour; condensation zones for condensing the water vapour into condensed water, the condensation zones being in fluid communication with the evaporation zones; water vapour conduits adapted to enable the fluid communication of the water vapour between the evaporation zones and the condensation zones; condensed water conduits adapted to enable the fluid communication of condensed water between the condensation zones and the evaporation zones; wherein the evaporation zones and the condensation zones alternate in position along a water transportation path between a water source site and a water destination site for enabling the transport of water from the water source site to the water destination site through alternating processes of evaporation-condensation and condensation-evaporation of the water.

12 Claims, 4 Drawing Sheets

(56) References Cited

U.S. PATENT DOCUMENTS

| | | | | |
|---|---|---|---|---|
| 2,820,744 A * | 1/1958 | Lighter | B01D 5/0066 | 202/190 |
| 3,338,797 A * | 8/1967 | Hermansen | C02F 1/14 | 159/903 |
| 3,351,536 A * | 11/1967 | Fox | B01D 5/0066 | 202/188 |
| 3,357,898 A * | 12/1967 | Novakovich | C02F 1/14 | 159/904 |
| 3,408,260 A * | 10/1968 | Feldman | B01D 5/0066 | 202/83 |
| 3,414,481 A * | 12/1968 | Kelly, Jr. | C02F 1/047 | 159/903 |
| 3,490,996 A * | 1/1970 | Kelly, Jr. | C02F 1/14 | 202/185.1 |
| 3,501,381 A * | 3/1970 | Delano | B01D 1/0005 | 159/904 |
| 4,172,767 A * | 10/1979 | Sear | C02F 1/047 | 159/903 |
| 4,197,162 A * | 4/1980 | Cardinal, Jr. | C02F 1/14 | 159/904 |
| 4,235,678 A * | 11/1980 | McKeen | C02F 1/14 | 202/185.1 |
| 4,244,189 A * | 1/1981 | Bliamptis | F03G 6/003 | 126/623 |
| 4,253,307 A * | 3/1981 | Smith | C02F 1/14 | 60/641.9 |
| 4,302,297 A * | 11/1981 | Humiston | C02F 1/046 | 202/185.1 |
| 4,326,923 A * | 4/1982 | Mortenson | C02F 1/046 | 126/561 |
| 5,064,505 A * | 11/1991 | Borgren | B01D 3/10 | 202/185.1 |
| 5,198,076 A * | 3/1993 | Borgren | B01D 3/10 | 159/901 |
| 5,409,578 A * | 4/1995 | Kaneko | C02F 1/14 | 159/903 |
| 5,522,970 A | 6/1996 | Shimizu et al. | | |
| 5,598,661 A | 2/1997 | Eiderman et al. | | |
| 6,001,222 A * | 12/1999 | Klein | B01D 5/0066 | 159/903 |
| 6,656,326 B2 | 12/2003 | Nagler | | |
| 7,494,572 B2 * | 2/2009 | Tonkin | B01D 61/362 | 159/DIG. 27 |
| 2002/0092761 A1 | 7/2002 | Nagler | | |
| 2003/0038022 A1 * | 2/2003 | Rogde | B01D 5/009 | 202/234 |
| 2003/0209419 A1 * | 11/2003 | Tonkin | B01D 61/362 | 203/10 |
| 2010/0275599 A1 * | 11/2010 | Glynn | B01D 1/0035 | 60/641.9 |
| 2012/0112473 A1 * | 5/2012 | Glynn | B01D 1/0035 | 290/1 R |
| 2012/0138447 A1 * | 6/2012 | Glynn | B01D 1/0035 | 202/189 |
| 2014/0034476 A1 * | 2/2014 | Ljunggren | C02F 1/14 | 203/10 |
| 2014/0034477 A1 * | 2/2014 | Landrok | B01D 1/0035 | 203/10 |
| 2014/0158516 A1 * | 6/2014 | Landrok | B01D 1/0035 | 203/10 |
| 2016/0057948 A1 * | 3/2016 | Alkhazraji | A01G 25/16 | 202/189 |
| 2016/0059148 A1 * | 3/2016 | Alkhazraji | B01D 1/0005 | 202/189 |

\* cited by examiner

SOLAR STILL SYSTEM AND RELATED WATER TRANSPORTATION APPARATUS

CROSS-REFERENCE

The present application is a Continuation-In-Part (CIP) of U.S. patent application Ser. No. 14/469,255, filed on Aug. 26, 2014, which is incorporated herein by reference in its entirety.

FIELD OF THE INVENTION

The present invention generally relates to the field of water distillation, and more particularly to an apparatus for production of distilled water from contaminated water bodies, knowingly natural contaminated water bodies such as seas and oceans, and further related to water transportation system and more particularly to system for transporting distilled water from water bodies to land.

BACKGROUND OF THE INVENTION

There are various types of distillation techniques known in the art including solar distillation. The solar distillation technique uses solar energy for creating an evaporation-condensation cycle where contaminated water is converted into distillate water through the evaporation-condensation process using solar energy. This cycle is well known in nature, as rain (which is a form of distilled water) occurs through a natural phenomenon of hydrologic cycle when water in natural water bodies like oceans, seas, rivers and ponds evaporates by the effect of solar energy and gets accumulated in the atmosphere as clouds and fogs to be condensed and fall again on the earth surface in a form of rain and snow.

There are two traditional forms of solar distillation, active distillation and passive distillation. In passive solar distillation, the apparatus relies on the natural temperature difference between the basin and the top of the apparatus as a means to condense water. In active solar distillation, external energy is supplied to the basin to increase the temperature difference between the basin and the top to further improve productivity.

Traditional solar distillation systems have many drawbacks. For example, traditional solar distillation systems are installed on land and water must be fed to it from a nearby water source which results in complexities and limitations in transferring the non-potable water (brackish water or seawater) into the systems. Also, the water left out after purification is highly concentrated with salts, bacteria and other impurities such as ion which must be removed from the systems after each purification cycle according to certain standards. This adds to the complexities and limitations of traditional systems. In addition, the production of potable water using these traditional systems is limited to the size of the reservoirs which also result in complexities and limitations to produce and maintain.

Natural water bodies on earth contain huge amount of water, however most of the total available water on earth is practically not potable and therefore not consumable or usable by humans because it is either saline water or brackish water. Such natural water bodies comprise oceans, seas, rivers, ponds and the like. Traditional distillation systems have failed to efficiently use the natural water bodies for the production of distilled water.

SUMMARY OF THE INVENTION

Therefore, it is an object of the present invention to provide an apparatus and method for production of distilled water directly from the natural water bodies which would overcome at least a part of the above mentioned drawbacks.

As a first aspect of the present invention, there is provided a solar still apparatus for converting contaminated water contained in a contaminated water body into distillate water, the contaminated water body having a water surface, the solar still apparatus comprising a cover in the form of a geometrical projection comprising a wall, an opening and a chamber, wherein:

the wall is adapted to be in thermal communication with the external environment for capturing solar heat and in optical communication with the opening for allowing passage of solar rays from the external environment to the opening;

the opening is adapted to be in optical communication with the wall and the surface of the contaminated water body for allowing passage of the solar rays from the wall to the surface of the contaminated water body for heating the contaminated water to form a vapor, and adapted to be in fluid communication with the surface of the contaminated water body and the chamber for allowing passage of the vapor from the surface of the contaminated water body inside the chamber; and the chamber is defined by the wall, the chamber being adapted to be in fluid communication with the opening for receiving the vapor formed and condensing said vapor for forming condensed distillate water therefrom.

Preferably, the opening is adapted to form a seal with the surface of the contaminated water body for sealing the chamber and restricting the formed vapor from exiting the chamber to the external environment.

Preferably, the wall is made of a transparent material for enabling the passage of the solar rays. Preferably, the wall is made of a rigid material such as plastic, or metallic or ceramic.

The solar still apparatus as claimed in claim 1 further comprising an optical lens adapted to concentrate and direct the sun rays toward the opening.

In an embodiment of the invention, the optical lens forms an integral part of the wall. The lens can also be an independent component secured to the wall.

In an embodiment of the invention, the apparatus further comprises a floatable base for supporting and enabling the cover to float over the surface of the contaminated water body.

Preferably, the floatable base comprises floatable material such as foam. The floatable base can also comprise any other floatable material capable of enabling the cover to float. The base can also comprise inflatable parts such as floaters.

In an embodiment of the invention, the apparatus further comprises an anchorage device. Preferably, the anchorage device is adapted to be anchored to the ground of the contaminated water body for restricting the base (and the cover) from moving over the water.

In an embodiment of the invention, the apparatus further comprises a condensed water collector adapted to be secured to the wall inside the chamber for collecting the condensed distillate water forming on the surface of the wall inside the chamber.

Preferably, the condensed water collector is in the form of a gutter, however it can take any other shape depending on the nature/shape/configuration of the wall/cover.

In an embodiment of the invention, the apparatus further comprises a conduit in fluid communication with the condensed water collector for directing the condensed distillate water outside the chamber.

In an embodiment of the invention, the apparatus further comprises an off-shore reservoir in fluid communication with the conduit for storing the condensed distillate water. Preferably, the off-shore is located in proximity of the cover.

In an embodiment of the invention, the apparatus further comprises a pump in fluid communication with the off-shore reservoir for pumping the distillate water stored inside the off-shore reservoir to a land reservoir through long range conduits.

Preferably, the off-shore reservoir is a floatable reservoir adapted to float over the surface of the contaminated water body.

Preferably, the conduit is a floatable conduit adapted to float over the surface of the contaminated water body.

In an embodiment of the invention, the geometrical projection form of the cover is a dome extending along a vertical axis from a bottom end to a top end, the bottom end being in contact with contaminated water body when the apparatus is in operation.

Preferably, the cover opening is defined by a circular cross-section of the dome orthogonal to the vertical axis between the bottom end and the top end. The cross-section can for example be at the bottom end of the dome.

Preferably, the opening defined by the cross-section has a circumference forming a cover base, the solar still apparatus further comprising a floatable material jacketing the base for enabling the base to float over the surface of the contaminated water body.

The geometrical projection form can however be any other geometrical form suitable to capture the sun rays and direct them to an opening with a direct access to the contaminated water and in fluid communication with a closed chamber, such as a cone.

Preferably, the opening defined by the cross-section has a circumference forming a cover base, the solar still apparatus further comprising a floatable material jacketing the base for enabling the base to float over the surface of the contaminated water body.

As a further aspect of the invention, there is provided a water transportation system comprising:
  evaporation zones for converting water into water vapour;
  condensation zones for condensing the water vapour into condensed water, the condensation zones being in fluid communication with the evaporation zones;
  water vapour conduits adapted to enable the fluid communication of the water vapour between the evaporation zones and the condensation zones;
  condensed water conduits adapted to enable the fluid communication of condensed water between the condensation zones and the evaporation zones;
wherein the evaporation zones and the condensation zones alternate in position along a water transportation path between a water source site and a water destination site for enabling the transport of water from the water source site to the water destination site through alternating processes of evaporation-condensation and condensation-evaporation of the water.

Preferably, the water vapour conduits and the condensed water conduits have respectively lower ends in proximity of the water source site and upper ends in a direction opposite to the water source site, and preferably the water vapour conduits upper ends are connected to the condensed water conduits upper ends forming the condensation zones and the water vapour conduits lower ends are connected to the condensed water conduits lower ends forming the evaporation zones.

Preferably, the water transportation path has a water path axis defined by a straight line between the water source site and the water destination site, and the evaporation zones are substantially at a same height with respect to each other from the water path axis and the condensation zones are substantially at same height with respect to each other from the water path axis.

Preferably, the water source site is located in a water body having a water level defining a water level axis.

Preferably, the water path axis is substantially parallel to the water level axis.

Preferably, the water path axis forms a positive angle with respect to the water level axis, such that the evaporation zones have different heights with respect to each other from the water level axis and the condensation zones have different heights with respect to each other from the water level axis.

Preferably, the water source site is an off-shore reservoir in the water body and the water destination site is a land reservoir.

As a further aspect of the invention, there is provided a solar still system for converting contaminated water contained in a contaminated water body into distillate water, the contaminated water body having a water surface, the solar still system comprising:
  a cover in the form of a geometrical projection comprising a wall, an opening and a chamber, wherein:
    the wall is adapted to be in thermal communication with the external environment for capturing solar heat and in optical communication with the opening for allowing passage of solar rays from the external environment to the opening;
    the opening is adapted to be in optical communication with the wall and the surface of the contaminated water body for allowing passage of the solar rays from the wall to the surface of the contaminated water body for heating the contaminated water to form a vapor, and adapted to be in fluid communication with the surface of the contaminated water body and the chamber for allowing passage of the vapor from the surface of the contaminated water body inside the chamber; and
    the chamber is defined by the wall, the chamber being adapted to be in fluid communication with the opening for receiving the vapor formed and condensing said vapor for forming condensed distillate water therefrom.
  a water transportation apparatus comprising:
    evaporation zones for converting water into water vapour;
    condensation zones for condensing the water vapour into condensed water, the condensation zones being in fluid communication with the evaporation zones;
    water vapour conduits adapted to enable the fluid communication of the water vapour between the evaporation zones and the condensation zones;
    condensed water conduits adapted to enable the fluid communication of condensed water between the condensation zones and the evaporation zones;
    wherein the evaporation zones and the condensation zones alternate in position along a water transportation path between the a water source site and a water destination site for enabling the transport of the condensed distillate water from the water source site to the water destination site through alternating processes of evaporation-condensation and condensation-evaporation of the water.

Preferably, the system further comprises a condensed water collector secured to the wall inside the chamber for collecting the condensed distillate water.

Preferably, the condensed water collector is in the form of a gutter.

Preferably, the system further comprises a conduit in fluid communication with the condensed water collector for directing the condensed distillate water outside the chamber.

Preferably, the system further comprises an off-shore reservoir in fluid communication with the conduit for storing the condensed distillate water, the off-shore reservoir being the water source site.

Preferably, the water destination site is a land reservoir distant from the off-shore reservoir.

Preferably, the off-shore reservoir is a floatable reservoir adapted to float over the surface of the contaminated water body.

Preferably, the water vapour conduits and the condensed water conduits have respectively lower ends in proximity of the water source site and upper ends in a direction opposite to the water source site, and the water vapour conduits upper ends are connected to the condensed water conduits upper ends forming the condensation zones and the water vapour conduits lower ends are connected to the condensed water conduits lower ends forming the evaporation zones.

Preferably, the water transportation path has a water path axis defined by a straight line between the water source site and the water destination site, and wherein the evaporation zones are substantially at a same height with respect to each other from the water path axis and the condensation zones are substantially at same height with respect to each other from the water path axis.

Preferably, the water source site is located in a water body having a water level defining a water level axis.

Preferably, the water path axis is substantially parallel to the water level axis.

Preferably, the water path axis forms a positive angle with respect to the water level axis, such that the evaporation zones have different heights with respect to each other from the water level axis and the condensation zones have different heights with respect to each other from the water level axis.

BRIEF DESCRIPTION OF THE DRAWINGS

The invention will now be described with reference to the accompanying drawings, which illustrate a preferred embodiment of the present invention without restricting the scope of the invention's concept, and in which.

DETAILED DESCRIPTION OF THE INVENTION

Solar Still Apparatus

Figure 1:
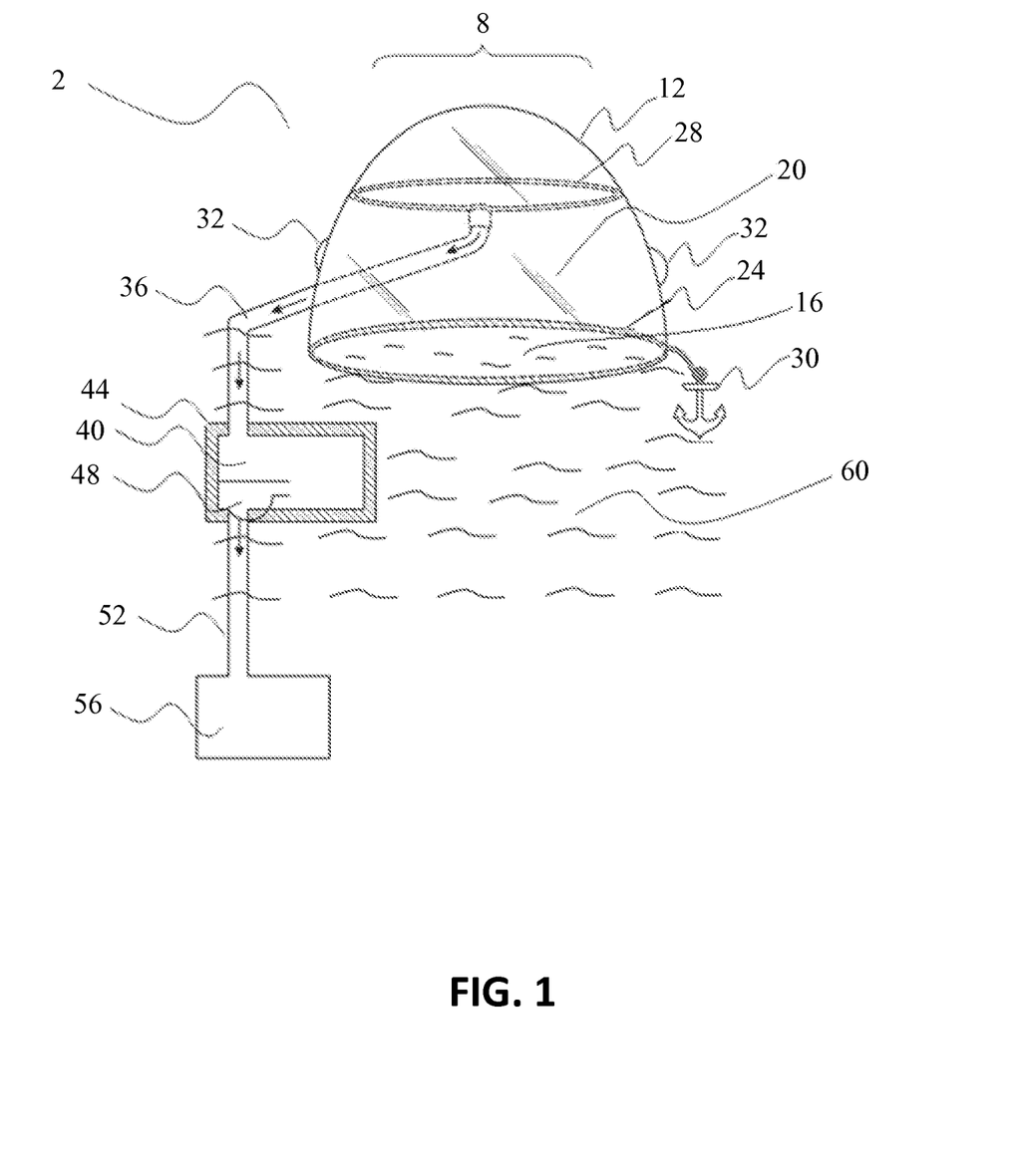
FIG. 1 illustrates a solar still apparatus according to a first embodiment of the present invention.
Figure 2:
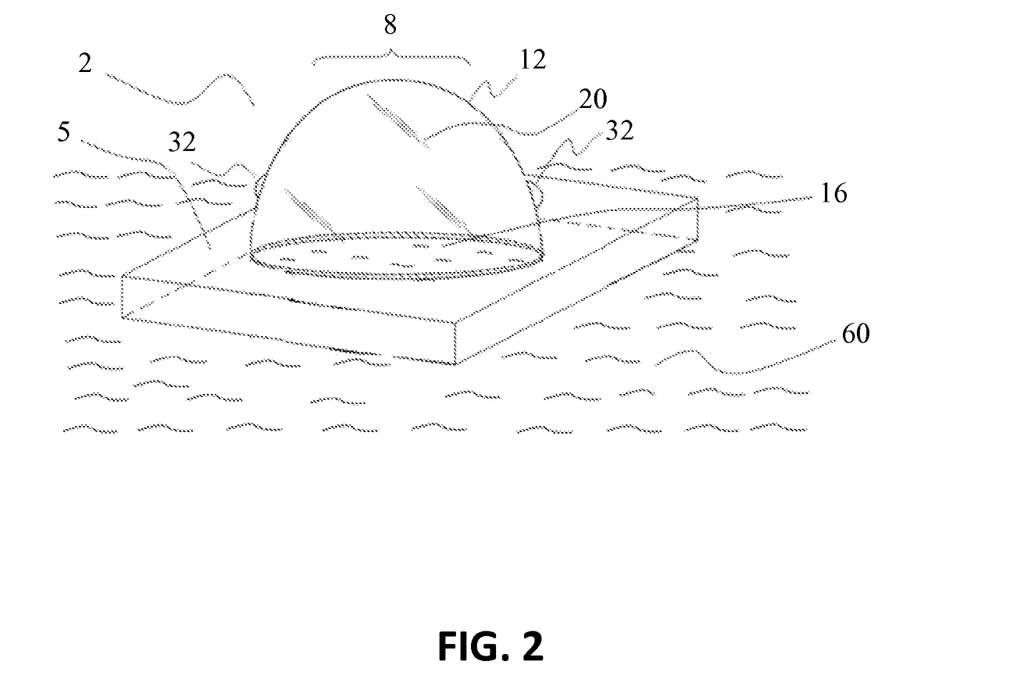
FIG. 2 illustrates a solar still apparatus according to another embodiment of the present invention.

Referring to FIGS. 1 and 2, there is provided a solar still apparatus 2 for converting contaminated water contained in a contaminated water body 60 into distillate water. The contaminated water body 60 can be any natural water body or man-made/artificial water body such as an ocean, sea, river, pond and the like. The solar still apparatus 2 comprises a cover 8 in the form of a geometrical projection comprising a wall 12, an opening 16 and a chamber 20.

The geometrical projection 8 can have any suitable form such as conical, domical, rectangular, square, and the like. A suitable geometrical projection 8 would provide a sufficiently spaced chamber 20 over the surface of the contaminated water body 60 to accumulate the water vapor, efficiently directs the solar rays to the water surface to enhance evaporation, and allows minimum loss of water vapor from the opening 16. The dimensions of the projection 8 may be scaled up or scaled down depending on the application.

The domical form is suitable due to its stability and the geometrical structure of its external wall 12 suitable to bounce solar rays inside the structure towards the opening 16.

The wall 12 is adapted to be in thermal communication with the external environment (atmosphere) for capturing solar heat and adapted to be in optical communication with the opening 16 for allowing passage of the solar rays from the external environment to the opening 16. The solar rays would pass through the wall 12 to the opening 16 via the chamber 20.

The wall 12 is made of a suitable material for capturing the heat all in allowing penetration of the solar rays through the wall 12 inside the opening 16. The wall 12 is also adapted for preventing the formed vapor to evade through its structure to the external environment. The wall 12 may however be modified for a porous structure to enhance the condensation of water vapor through a capillary condensation mechanism.

The wall 16 is preferably made of a transparent material such as transparent plastic or glass. It is preferable for the material to be rigid such as rigid plastic in order to maintain form and structure. The rigid plastic is easy to maintain and has a long standing life time. However a person skilled in the art should appreciate that the material can be a flexible material such as rubber. In this case, the flexible material can be inflatable to take a desired shape. The material is preferably transparent in order to allow the solar rays penetrate the wall 12 inside the chamber 20 in order to reach the opening 16.

If the wall 12 is opaque, the solar rays (or at least a big part) will not be able to penetrate the wall for heating the contaminated water. The apparatus may still function, though less efficiently, as the contaminated water within the opening 16 may still be heated by the neighboring water located outside the opening 16 which is exposed directly to the solar rays. This is because the contaminated water within and outside the opening 16 is interconnected and heat can be exchanged therebetween.

The opening 16 is adapted to be in optical communication with the wall 12 (or a part thereof) and the surface of the contaminated water body 60 for allowing passage of the solar rays from the wall 12 to the surface of the contaminated water body 60 for heating the contaminated water to form a vapor.

Preferably, the optical communication is a direct optical communication in the sense that the solar rays are not interrupted by any other structure between the wall 12 and the opening 16. A domical form allows a good optical communication between the wall 12 and the opening 16. This is because a big part of the solar rays hitting the wall 12 will penetrate the cover wall 12 in the direction of the opening 16.

The opening 16 is also adapted to be in fluid communication with the surface of the contaminated water body 60 and the chamber 20 for allowing passage of the vapor from the surface of the contaminated water body 60 inside the chamber 20. In fact, when the contaminated water is heated by the solar rays inside the opening, it evaporates and climbs inside the chamber 20 through the opening 16. The opening 16 is therefore adapted to allow the vapor passage from the surface of the contaminated water body 60 inside the chamber 20. When the cover 8 is a dome, the opening 16 is defined by a cross-section of the dome orthogonal to the vertical axis between the bottom end and the top end of the dome. The opening may correspond to the base level at the bottom end of the dome, or may correspond to any other orthogonal cross-section above the base level. This last scenario can happen when the base falls below the surface of the contaminated water body when in operation. When the base of the dome floats over the surface of the water body 60, the base should have a suitable structure to restrict the vapor from evading the chamber 16 from between the base and the surface of the water.

The chamber 20 is the internal space of the geometrical projection located between the wall 12 and the opening 16. It is physically defined by the wall 12 of the cover 8. When the apparatus 2 is in operation and the cover opening 16 is emerged inside the contaminated water body 60, the chamber 20 is in fluid communication with the opening 16 for receiving the vapor formed at the surface of the contaminated water body 60 and for condensing said vapor for forming condensed distillate water therefrom.

The chamber 60 is adapted to be enclosed between the wall 12 and the surface of the contaminated water body 60 when the apparatus 2 is in operation in order to form a seal for restricting the vapor from exiting the chamber 20. When the surface of the contaminated water body 60 gets heated, the water evaporates and the vapor climbs up inside the chamber 20 and condensates at the internal surface of the wall 12 inside the chamber 20. This is due to the fact that the temperature of the external environment is lower than the temperature at the surface of the wall 12 inside the chamber 20. The condensed water is distillate water free of any contamination. The contaminants (e.g. salt, etc) stay back inside the contaminated water body 60 which avoids any maintenance in recuperating and cleaning these.

In an embodiment of the present invention, the solar still apparatus 2 further comprises an optical lens 32 adapted to concentrate and direct the sun rays captured from the external environment toward the opening 16. The optical lens 32 is preferably a concave lens secured to the wall 12 of the cover 8. The optical lens 32 can be an independent component or alternatively can form an integral part of the wall 12. The optical lens can be made of plastic, glass or any other suitable material.

The solar still apparatus 2 is adapted for use in deep water bodies such as oceans and seas. The projection structure (cover 8) therefore needs to be floatable in order to have a part of the projection extending outside the water and another part inside or at the surface of the contaminated water body 60. The part outside the water is for capturing the sun rays and heat and for forming the chamber portion 20 for receiving the vapor and forming the condensed water.

There are different manners to enable the cover 8 to float. In an embodiment of the invention, as illustrated in FIG. 1, the base 24 of the cover 8 can be made of a floatable material such as foam. The base 24 can also be made of a non floatable material but supported by an independent component having such a property in order to enable the cover to float over the surface of the contaminated water body 60. It can for example be in the form of a floatable jacket adapted to enrobe the base 24.

In another embodiment of the invention, as illustrated in FIG. 2, there is provided a floater 5 adapted to receive and support the cover 8 for enabling it to float all in allowing fluid communication between the opening 16 and the surface of the contaminated water body 60. The floater can have an opening providing access of the cover to the contaminated water body 60. The floater can for example be a floating vessel or ship.

In an embodiment of the present invention, the solar still apparatus 2 further comprises an anchorage device 30 adapted to be anchored to the ground of the contaminated water body 60 for restricting the base (and the cover) from moving/drifting over the water.

In an embodiment of the present invention, the solar still apparatus 2 further comprises a condensed water collector 28 for collecting the condensed distillate water. Preferably, the condensed water collector 28 is secured to the wall 12 inside the chamber 20. The condensed water collector can be in the form of a gutter running along the wall inside the chamber 20. As the vapor gets condensed at the wall 12 of the chamber 20, the condensed water drops inside the gutter. The condensed water collector can take any other suitable form as a function of the form of the cover 8.

In an embodiment of the present invention, the solar still apparatus 2 further comprises a conduit 36 in fluid communication with the condensed water collector 28 for directing the condensed distillate water outside the chamber 20. The conduit 36 can be in the form of a tube, pipe or any other water transport medium. In one embodiment, the conduit 36 is adapted to be in fluid communication with a network of reservoirs and pipelines for collecting, directing and storing the collected distillate water. This may include pipes and valves located in proximity or remotely from the still solar apparatus 2.

In an embodiment of the present invention, the conduit 36 is adapted to be in fluid communication with off-shore reservoir 40 for storing the collected distillate water. The off-shore reservoir 40 and the conduit 36 are preferably adapted to float over the surface of the contaminated water body 60. They can for example be supported or jacketed by a floatable material such as foam. The off-shore reservoir 40 can have an external layer 44 made of foam or any other floatable material.

In an embodiment of the invention, the solar still apparatus 2 further comprises a pump 48 in fluid communication with the off-shore reservoir 40 for pumping the distillate water stored inside the off-shore reservoir 40 to a land reservoir 56 through long range conduits 52. These long range conduits can also be adapted to float by being made or supported by a floatable material.

Water Transportation System

Figure 3:
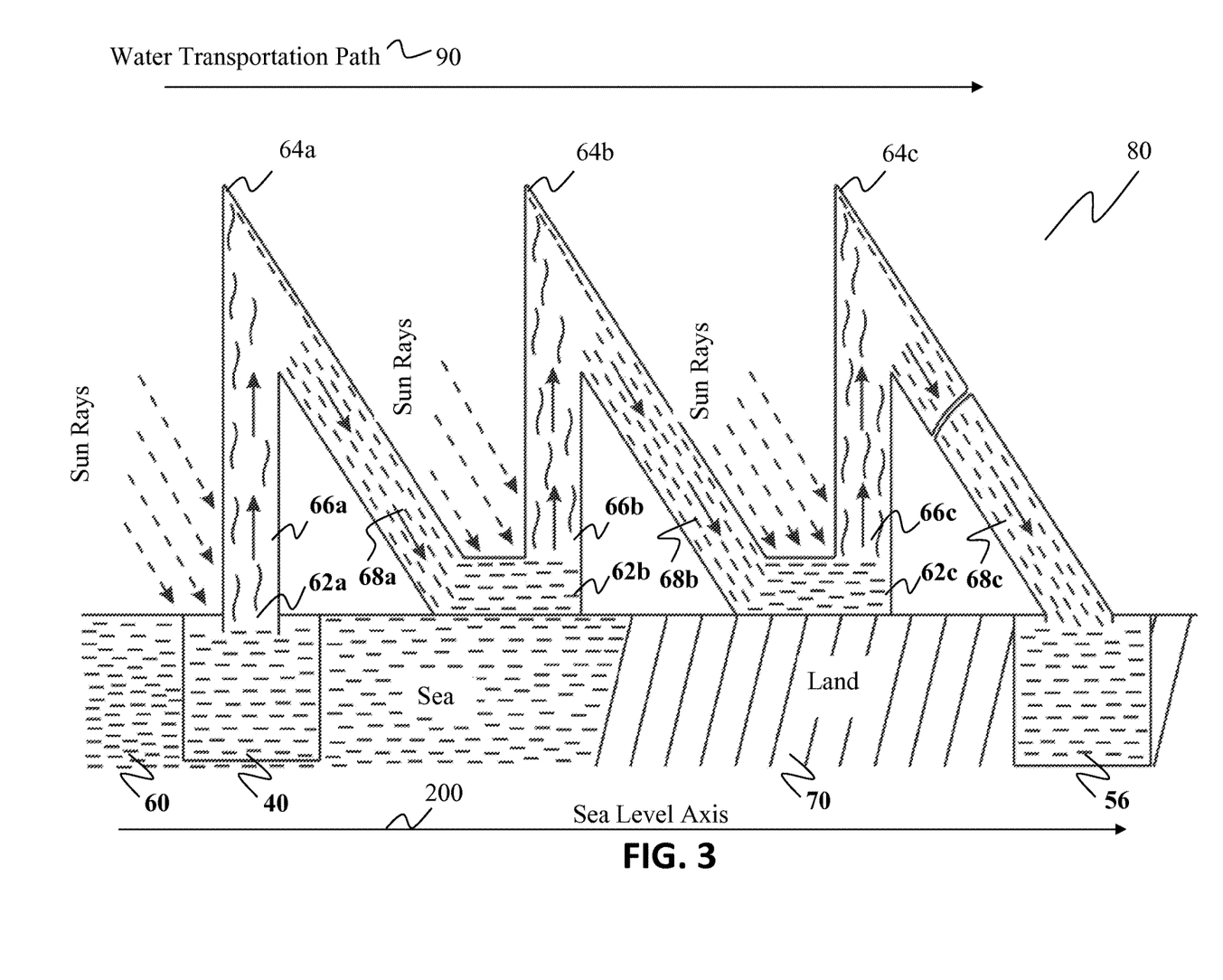
FIG. 3 illustrates a water transportation system according to one embodiment of the invention.
Figure 4:
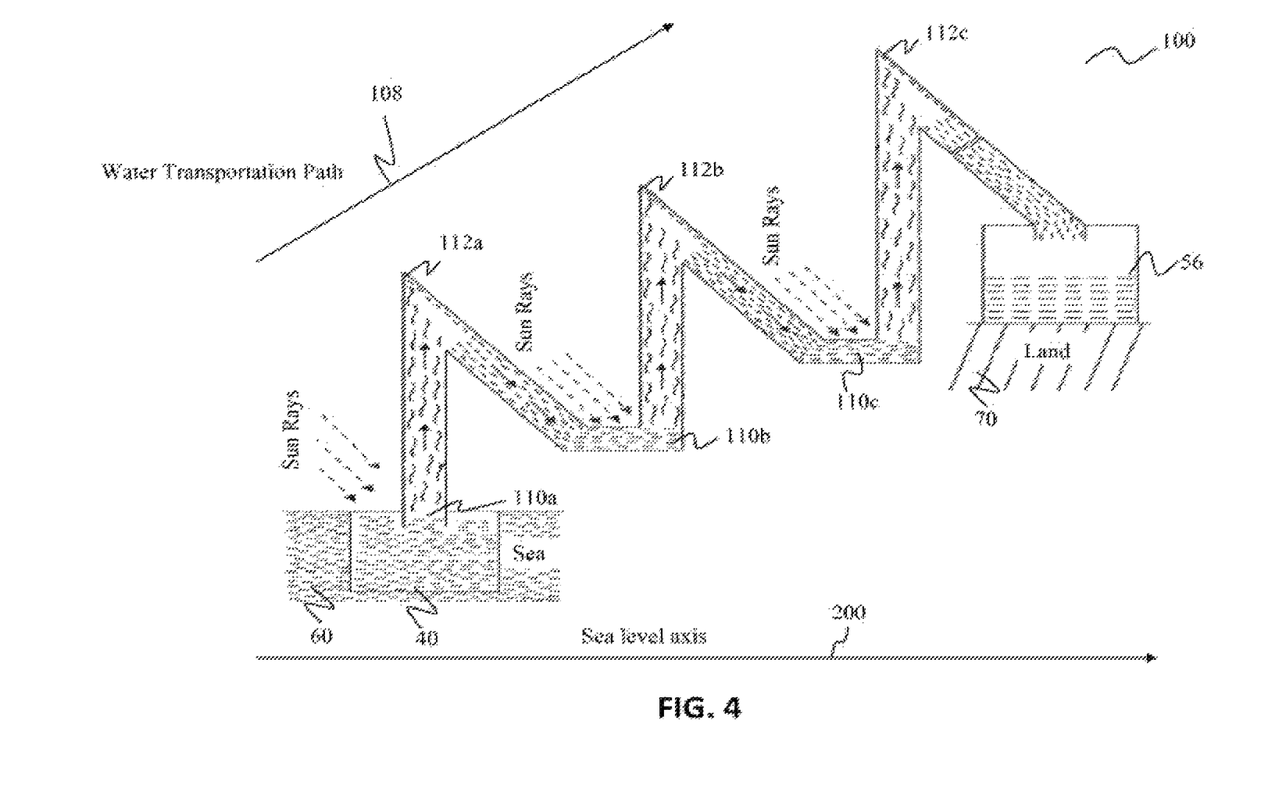
FIG. 4 illustrates a water transportation system according to another embodiment of the invention.

Referring to FIGS. 3 and 4, there is provided a water transportation system 80 adapted to transport the distilled water from a first site 72 to a second site 74. According to an embodiment of the invention, the first site 72 comprises the off-shore reservoir 40 located in the close vicinity of the solar still apparatus 2 inside the water body 60. The off-shore reservoir 40 may either be floating on the water body 60 or it may be immersed. The second site 74 comprises the land reservoir 56 located in the distant land surface 70.

The water transportation system 80 is adapted to transport water from the first site 72 to the second site 74 along a water transportation path 90 through a continuous evaporation-condensation process. The water transportation system 80 comprises evaporation zones 62, condensation zones 64, vapor conduits 66 and condensed water conduits 68.

The evaporation zones 62 are adapted to enable the evaporation of water into water vapor. The condensation zones 64 are adapted to enable the condensation of water vapor into condensed water. The vapor conduits 66 are adapted to enable the natural flow of water vapor from the evaporation zones 62 to the condensation zones 64. The condensed water conduits 68 are adapted to enable the natural flow of the condensed water from the condensation zones 64 to the evaporation zones 62.

The water transportation system 80 is structured such that the evaporation zones 62, the condensation zones 64, the vapor conduits 66 and the condensed water conduits 68 are distributed along a water transportation path 90 between the first site 72 and the second site 74 such that the continuous evaporation-condensation process of the transported water throughout the various evaporation and condensation zones 62 & 64 enables the movement of water in the direction of the water transportation path 90 until it reaches the land reservoir 56.

FIG. 3 shows an example of the water transportation system comprising three evaporation zones 62a, 62b, 62c three condensation zones 64a, 64b, 64c, three water vapor conduits 66a, 66b, 66c and three condensed water conduits 68a, 68b, 68c. It should be appreciated that the number of the evaporation/condensation zones and water vapor/condensed water conduits may vary between when application and another based on the distance between the offshore reservoir 40 and the land reservoir 56 among other factors.

The following explains the process of transporting water between the offshore and land reservoirs 40 & 56. At an initial stage, water from the off-shore reservoir 40 is being evaporated at a first evaporation zone 62a. The water vapor formed is transported to a first condensation zone 64a through a first vapor conduit 66a. Reaching the first condensation zone 64a, the water vapor is condensed into water. The formed condensed water flows then to the second evaporation zone 62b through a first water conduit 64a.

Reaching the second evaporation zone 62b, the water is evaporated again and the water vapor produced flows to the second condensation zone 64b through the second vapor conduit 66b. Reaching the second condensation zone 64b, the vapor water is condensed into water before it flows to the third evaporation zone 62c through the second condensed water conduit 68b.

Reaching the third evaporation zone 62c, the water is evaporated again and the water vapor produced is transported to the third condensation zone 64c through the third vapor conduit 66c. Reaching the third condensation zone 64c, the vapor water is condensed into water before it is flows to the land reservoir 56.

The water vapor conduits 66 and the condensed water conduits 68 are hollow conduits made of any suitable geometric shape, preferably cylindrical. The external walls of the conduits 66 & 68 are made from any suitable rigid material such as glass, rigid plastics, metals, alloys and the like.

The water vapor conduits 66 are substantially vertical extending upwardly from a lower extremity in proximity of the sea level to an upper extremity in direction opposite the sea level. The condensed water conduits 68 are substantially inclined and extend downwardly from an upper extremity to a lower extremity in proximity of the sea level. The upper extremities of the water vapor conduits 66 are respectively connected to the upper extremities of the condensed water conduits 68. The water condensation zones 64 are formed in proximity of the connection areas between the upper extremities of the water vapor conduits 66 and the upper extremities of the condensed water conduits 68.

The dimensioning of the conduits 66 & 68 is conducted taking into account the expected temperature difference between the evaporation zones 62 and condensation zones 64 and thermal conductivity of the conduits 66 & 68.

The external walls of the water vapor conduits 66 are preferably made of any transparent materials such as glass or rigid transparent plastic to allow the sun rays to penetrate the walls and maintain the upward movement of water vapors towards the condensation zones 64.

The evaporation zones 62 are adapted to absorb the heat from the solar rays in order to sufficiently increase the temperature of the water such that water gets evaporated in the evaporation zones 62 to form vapors. The vapors thus formed create a low pressure area in the evaporation zones 62 which causes the vapors to rise from the lower extremity to the upper extremity of the water vapor conduits 66. The water vapor enters the condensation zones 64 from the upper extremity of the water vapor conduits 66.

The condensation zones 64 are adapted to dissipate the heat from the vapor to the surrounding atmosphere such that the vapors when enter the condensation zones 64 release its latent heat and condenses to form water. The latent heat is preferably released from the condensation zones 64 to the surrounding atmosphere by a conduction/convection process. The condensed water flows from the upper extremity to the lower extremity of the inclined condensed water conduits 68. The water again enters the evaporation zones 62 from the lower extremity of the inclined conduits 68.

Preferably, the condensation zones 64 are adapted to allow all the water vapor to condense instantly by dissipating the latent heat to the surrounding environment, in order to keep the transportation system 80 at maximum capacity.

The series of evaporation and condensation process in the evaporation zones 62 and the condensation zones 64 lead to the overall transport of water from the first site 72 to the second site 74 along the water transportation path 90. In an embodiment of the invention, the condensation zones 64 may comprise steam traps (not shown) for preventing the backflow of condensed water into the evaporation zones 62 through the water vapour conduits 66.

In one embodiment, as illustrated in FIG. 3, the first site 72 and the second site 74 are located at substantially the same height with respect to the sea level such that the evaporation zones 62 are substantially located at a same height with respect to each other from the sea level and the condensation zones 64 are substantially located at the same height with respect to each other from the sea level. The overall direction of the transportation of water takes place along a horizontal axis substantially parallel to the sea level axis.

In another embodiment, as illustrated in FIG. 4, the first site 72 and the second site 74 are located at different heights with respect to the sea level such that the evaporation zones 110 are substantially located at different heights with respect to each other from the sea level and the condensation zones 112 are substantially located at different heights with respect to each other from the sea level. The overall direction of the transportation of water takes place along an oblique axis substantially transversal to the sea level axis. In fact, the evaporation and condensation zones 110 & 112 gain height as they move forward along the water transportation path 90. In this optics, the evaporation zone 110c is higher than the evaporation zone 110*b* which is higher than the evaporation zone 110*a*. Also, the condensation zone 112*c* is higher than the condensation zone 112*b* which is higher than the condensation zone 112*a*.

The series of evaporation and condensation process in the evaporation zones 110 and the condensation zones 112 lead to the overall transport of water from the offshore reservoir 40 to the land reservoir 56 along the water transportation path 108 forming a positive angle with respect to the sea level axis.

While the invention has been made described in details and with reference to specific embodiments thereof, it will be apparent to one skilled in the art that various additions, omissions, and modifications can be made without departing from the spirit and scope thereof.

The invention claimed is:

1. A water transportation system comprising:
evaporation zones for converting water into water vapour;
condensation zones for condensing the water vapour into condensed water, the condensation zones being in fluid communication with the evaporation zones;
water vapour conduits adapted to enable the fluid communication of the water vapour between the evaporation zones and the condensation zones, wherein said water vapor conduits extend along a vertical axis that is perpendicular to a sea level axis;
condensed water conduits adapted to enable the fluid communication of condensed water between the condensation zones and the evaporation zones;
wherein the evaporation zones and the condensation zones alternate in position along a water transportation path between a water source site and a water destination site for enabling the transport of water from the water source site to the water destination site through alternating processes of evaporation-condensation and condensation-evaporation of the water, wherein the water source site is off-shore and the water destination site is a land reservoir,
and wherein a series of evaporation and condensation processes in the evaporation zones and the condensation zones lead to an overall transport of water from the water source site to the water destination site-along the water transposition path.

2. The water transportation system as claimed in claim 1 wherein the evaporation zones are substantially at a same height with respect to each other and the condensation zones are substantially at a same height with respect to each other.

3. The water transportation system as claimed in claim 2 wherein the water source site is located in a water body.

4. The water transportation system as claimed in claim 1 wherein the evaporation zones have different heights with respect to each other and the condensation zones have different heights with respect to each other.

5. A solar still system for converting contaminated water contained in a contaminated water body into distillate water, the contaminated water body having a water surface, the solar still system comprising:
a cover in the form of a geometrical projection comprising a wall, an opening and a chamber, wherein:
the wall is adapted to be in thermal communication with the external environment for capturing solar heat and in optical communication with the opening for allowing passage of solar rays from the external environment to the opening;
the opening is adapted to be in optical communication with the wall and the surface of the contaminated water body for allowing passage of the solar rays from the wall to the surface of the contaminated water body for heating the contaminated water to form a vapour, and adapted to be in fluid communication with the surface of the contaminated water body and the chamber for allowing passage of the vapour from the surface of the contaminated water body inside the chamber; and
the chamber is defined by the wall, the chamber being adapted to be in fluid communication with the opening for receiving the vapour formed and condensing said vapour at the internal surface of the chamber wall for forming condensed distillate water therefrom,
wherein the geometrical projection form of the cover is a dome extending along a vertical axis from a bottom end to a top end, the bottom end being in contact with the contaminated water body when the solar still system is in operation, and wherein a conduit in fluid communication with a condensed water collector is used for directing the condensed distillate water outside the chamber;
a water transportation apparatus comprising:
evaporation zones for converting water into water vapour;
condensation zones for condensing the water vapour into condensed water, the condensation zones being in fluid communication with the evaporation zones;
water vapour conduits adapted to enable the fluid communication of the water vapour between the evaporation zones and the condensation zones, wherein said water vapor conduits extend along a vertical axis that is perpendicular to a sea level axis;
condensed water conduits adapted to enable the fluid communication of condensed water between the condensation zones and the evaporation zones;
wherein the evaporation zones and the condensation zones alternate in position along a water transportation path between a water source site and a water destination site for enabling the transport of the condensed distillate water from the water source site to the water destination site through alternating processes of evaporation-condensation and condensation-evaporation of the water, wherein the water source site is off-shore and the water destination site is a land reservoir, and
wherein a series of evaporation and condensation processes in the evaporation zones and the condensation zones lead to an overall transport of water from the water source site to the water destination site along the water transportation path.

6. The solar still system as claimed in claim 5 wherein the condensed water collector is secured to the wall inside the chamber for collecting the condensed distillate water.

7. The solar still system as claimed in claim 6 wherein the condensed water collector is in the form of a gutter running along the wall inside the chamber.

8. The solar still system as claimed in claim 7 further comprising an off-shore reservoir in fluid communication with the conduit for storing the condensed distillate water, the off-shore reservoir being the water source site.

9. The solar still system as claimed in claim 8 wherein the offshore reservoir is a floatable reservoir adapted to float over the surface of the contaminated water body.

10. The solar still system as claimed in claim 5 wherein the evaporation zones are substantially at a same height with respect to each other and the condensation zones are substantially at a same height with respect to each other.

11. The solar still system as claimed in claim 10 wherein the water source site is located in a water body.

12. The solar still system as claimed in claim 5 wherein the evaporation zones have different heights with respect to each other and the condensation zones have different heights with respect to each other.

* * * * *